United States Patent
Chen et al.

(10) Patent No.: US 11,631,329 B2
(45) Date of Patent: Apr. 18, 2023

(54) VENUE LOCATION IDENTIFICATION FOR VEHICULAR ACCESS CONTROL

(71) Applicant: Honda Motor Co., Ltd., Tokyo (JP)

(72) Inventors: Bonnie Chen, Torrance, CA (US); Justin Sinaguinan, Playa Del Rey, CA (US); Jerry Bonnah, Brampton (CA); Junlei Zhang, Long Beach, CA (US)

(73) Assignee: Honda Motor Co., Ltd, Tokyo (JP)

( * ) Notice: Subject to any disclaimer, the term of this patent is extended or adjusted under 35 U.S.C. 154(b) by 380 days.

(21) Appl. No.: 16/923,456

(22) Filed: Jul. 8, 2020

(65) Prior Publication Data

US 2022/0013013 A1 Jan. 13, 2022

(51) Int. Cl.
| | |
|---|---|
| *G08G 1/14* | (2006.01) |
| *H04W 4/40* | (2018.01) |
| *G07B 15/06* | (2011.01) |
| *G06K 7/10* | (2006.01) |
| *G08G 1/01* | (2006.01) |

(52) U.S. Cl.
CPC ......... *G08G 1/148* (2013.01); *G06K 7/10306* (2013.01); *G07B 15/063* (2013.01); *G08G 1/0116* (2013.01); *G08G 1/146* (2013.01); *H04W 4/40* (2018.02)

(58) Field of Classification Search
CPC .................................................. G07B 15/063
See application file for complete search history.

(56) References Cited

U.S. PATENT DOCUMENTS

| | | |
|---|---|---|
| 8,499,494 B2 | 8/2013 | Osann, Jr. |
| 8,832,997 B2 | 9/2014 | Osann, Jr. |

(Continued)

FOREIGN PATENT DOCUMENTS

| | | |
|---|---|---|
| CN | 106981118 A | 7/2017 |
| EP | 3382657 A1 | 10/2018 |

(Continued)

OTHER PUBLICATIONS

P. Zips, H. Banzhaf, G. Quast and A. Kugi, "Increasing the Capacity for Automated Valet Parking Using Variable Spot Width," 2020 IEEE 23rd International Conference on Intelligent Transportation Systems (ITSC), 2020, pp. 1-6, doi: 10.1109/ITSC45102.2020. 9294185. (Year: 2020).*
Espacenet Machine Translation of CN Patent No. 106981118 A.
Espacenet Machine Translation of EP Patent No. 3382657 A1.

(Continued)

*Primary Examiner* — Jeff Zimmerman
*Assistant Examiner* — Wayne S. Murray
(74) *Attorney, Agent, or Firm* — Plumsea Law Group, LLC

(57) ABSTRACT

A venue location identification system for vehicular access control is described. In one embodiment, the system includes at least one access control device. The access control device includes a processor, a communication interface, and an actuating mechanism configured to control a barrier for providing access to a parking area. The system also includes a user device associated with a vehicle. The user device is configured to communicate with the communication interface of the at least one access control device using ultra wideband (UWB) communication technology. The user device is further configured to transmit an access request to the access control device via UWB requesting permission to leave the parking area as the vehicle approaches the barrier.

20 Claims, 8 Drawing Sheets

(56) References Cited

U.S. PATENT DOCUMENTS

| | | | |
|---|---|---|---|
| 9,715,773 B2 | 7/2017 | Clemente et al. | |
| 10,304,275 B2 | 5/2019 | Dyne et al. | |
| 10,328,898 B2 | 6/2019 | Golsch et al. | |
| 2005/0269404 A1* | 12/2005 | Landwirth | G07F 17/105 235/382 |
| 2015/0095123 A1* | 4/2015 | Wenninger | G07B 15/04 705/13 |
| 2015/0254981 A1* | 9/2015 | Tachibana | B60R 1/00 340/932.2 |
| 2016/0321925 A1* | 11/2016 | Al Suwaidi | G08G 1/0175 |
| 2018/0211188 A1 | 7/2018 | Bergdale et al. | |
| 2018/0211539 A1* | 7/2018 | Boss | G08G 1/168 |
| 2018/0362035 A1* | 12/2018 | Schein | B60W 50/08 |
| 2019/0080595 A1* | 3/2019 | Liang | G08G 1/142 |
| 2019/0319939 A1 | 10/2019 | Hamel et al. | |

FOREIGN PATENT DOCUMENTS

| | | |
|---|---|---|
| EP | 3404627 A1 | 11/2018 |
| GB | 1315533 A | 5/1973 |
| JP | 2018199999 A | 12/2018 |
| WO | 2014155048 A1 | 10/2014 |
| WO | 2019015700 A1 | 1/2019 |

OTHER PUBLICATIONS

Espacenet Machine Translation of EP Patent No. 3404627 A1.
Espacenet Machine Translation of JP Application No. 2018199999 A.

\* cited by examiner

FIG. 3
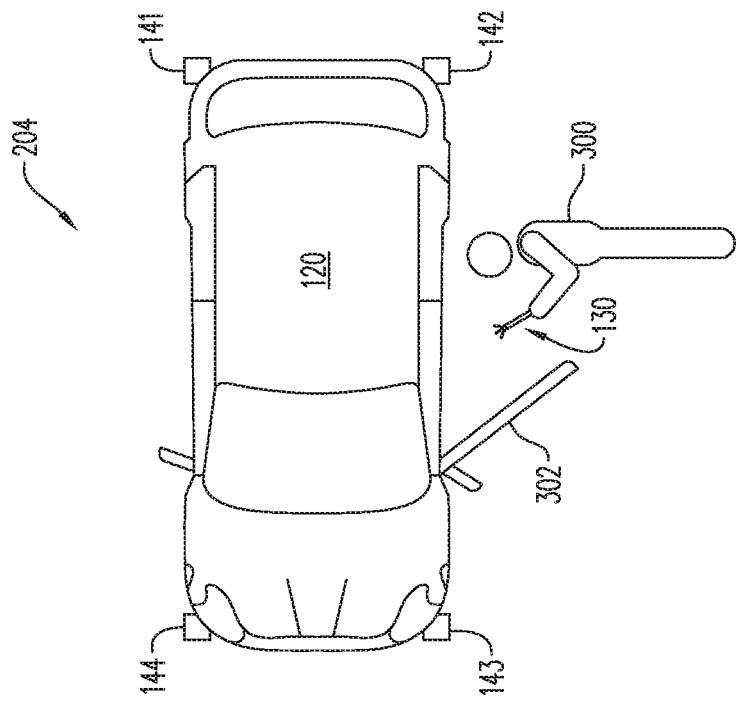
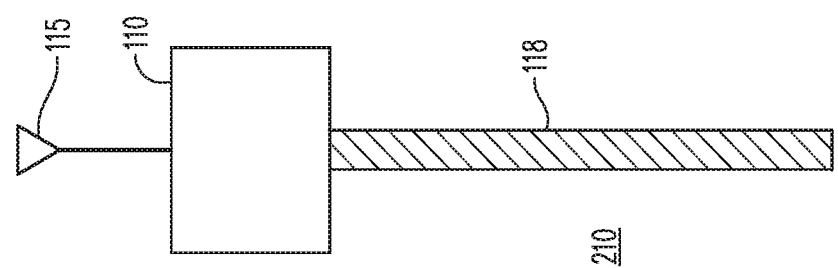

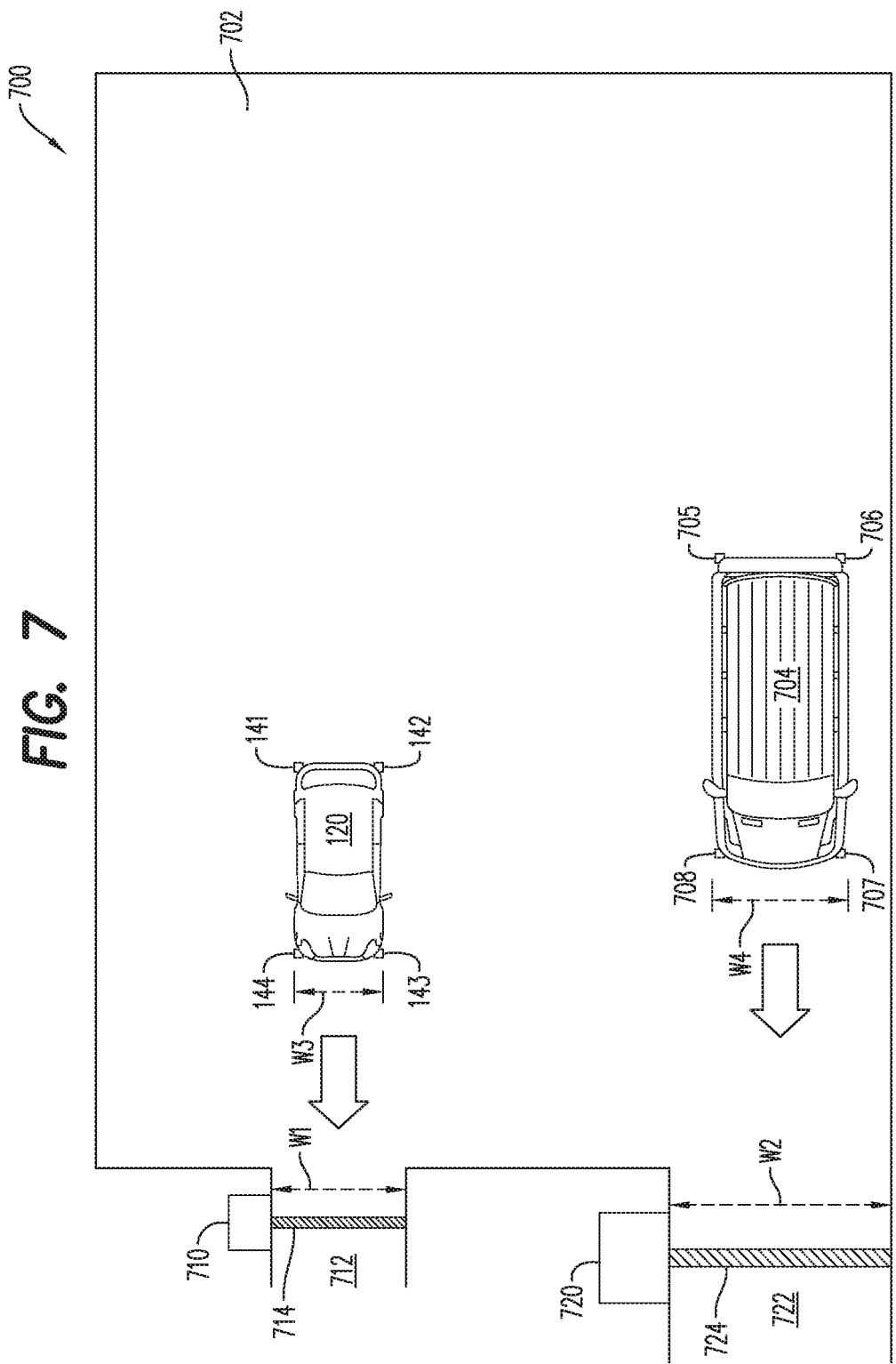

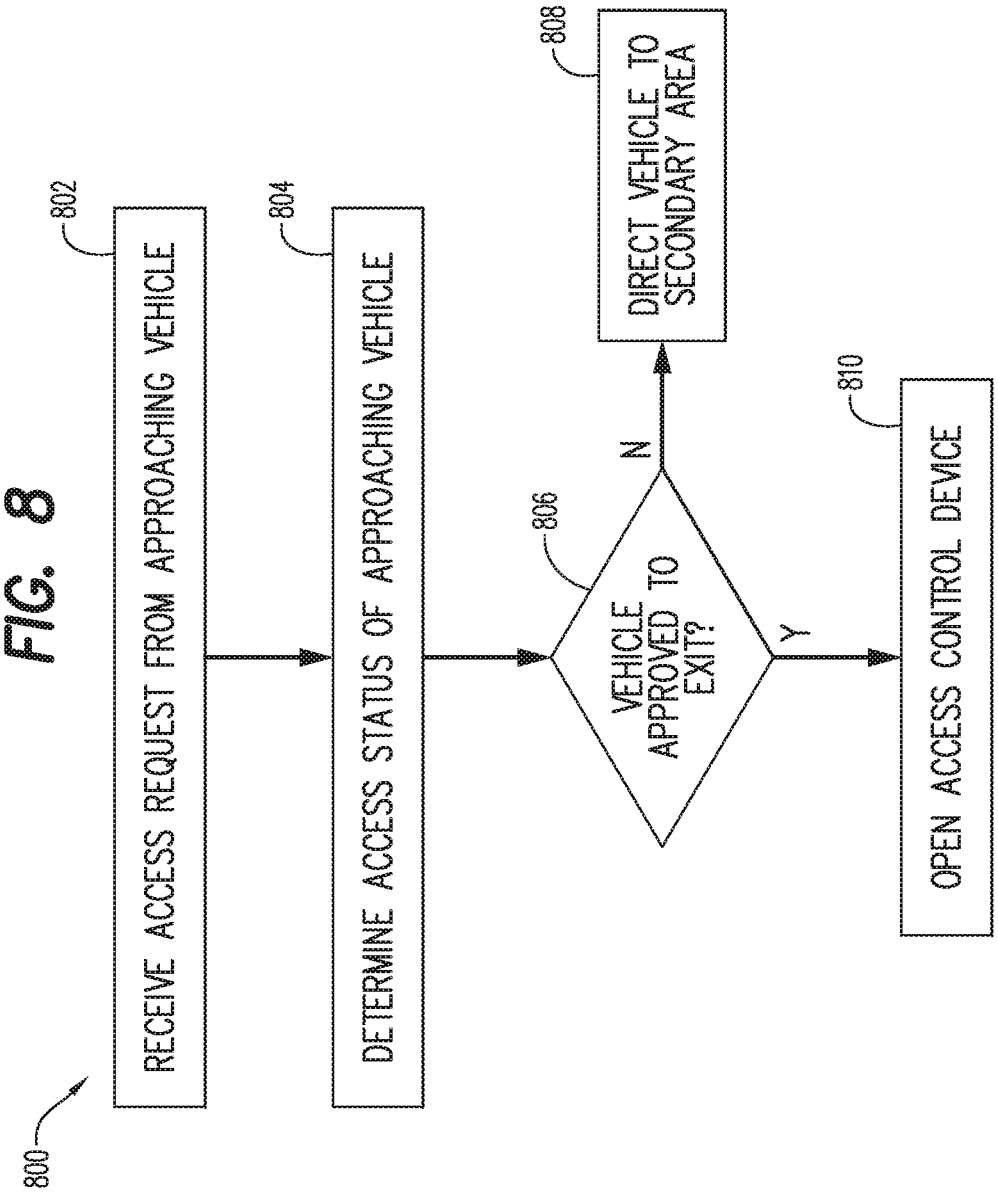

VENUE LOCATION IDENTIFICATION FOR VEHICULAR ACCESS CONTROL

BACKGROUND

This disclosure relates generally to vehicles, and in particular to a system and method for using identification of a vehicle location at a venue for access control.

Many venues, such as sports arenas, concert halls, stadiums, and theme parks, have large parking lots that are designed to accommodate thousands or tens of thousands of vehicles for the people attending events at the venue. In some cases, the parking lots may be larger than the venues themselves.

These types of venues often suffer from problems with entry and exit flow control when a large number of the people at the venue are attempting to arrive or depart the parking lots at the same time. In these situations, vehicular traffic can be significantly backed up at access points to the venue parking lot where a barrier of some kind is used to control entry and exit of vehicles into and out of the parking lot.

Accordingly, there is a need in the art for an improved system and method for using vehicle location identification at a venue to regulate and manage access control more efficiently.

SUMMARY

In one aspect, a venue location identification system for vehicular access control is provided. The system includes at least one access control device. The access control device includes a processor, a communication interface, and an actuating mechanism configured to control a barrier for providing access to a parking area. The system also includes a user device associated with a vehicle. The user device is configured to communicate with the communication interface of the at least one access control device using ultra wideband (UWB) communication technology. The user device is further configured to transmit an access request to the access control device via UWB requesting permission to leave the parking area as the vehicle approaches the barrier.

In another aspect, a method for providing vehicular access control to a parking area at a venue is provided. The method includes receiving an access request from a vehicle approaching an access control device via ultra wideband (UWB) communication technology. The method also includes determining an access status of the vehicle. The method includes determining whether or not the vehicle is approved to exit the parking area of the venue. Upon determining that the vehicle is approved to exit, the method including controlling a barrier of the access control device to an open position to allow the vehicle to exit.

In another aspect, a venue location identification system for vehicular access control is provided. The system includes a plurality of access control devices. Each access control device includes a processor, a communication interface, and an actuating mechanism configured to control a barrier for providing access to a parking area. The system also includes a user device associated with a vehicle. The user device is configured to communicate with the communication interface of the access control device using ultra wideband (UWB) communication technology. The venue location identification system is configured to receive information associated with the vehicle via UWB and direct the vehicle to a particular access control device of the plurality of access control devices based on the information.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 3 is a representative view of an example embodiment of vehicular access control using the venue location identification system in the example environment in accordance with aspects of the present disclosure;

FIG. 7 is a schematic view of another alternate embodiment of a venue location identification system for sized-based vehicular access control in accordance with aspects of the present disclosure; and FIG. 8 is a flowchart of an exemplary method for providing vehicular access control using a venue location identification system in accordance with aspects of the present disclosure.

DETAILED DESCRIPTION

Methods and systems for using vehicle location identification at a venue to regulate and manage access control are described herein. The techniques of the present embodiments may be used to provide a more efficient solution for allowing vehicles to exit a parking lot based on the vehicle's location information.

Figure 1:
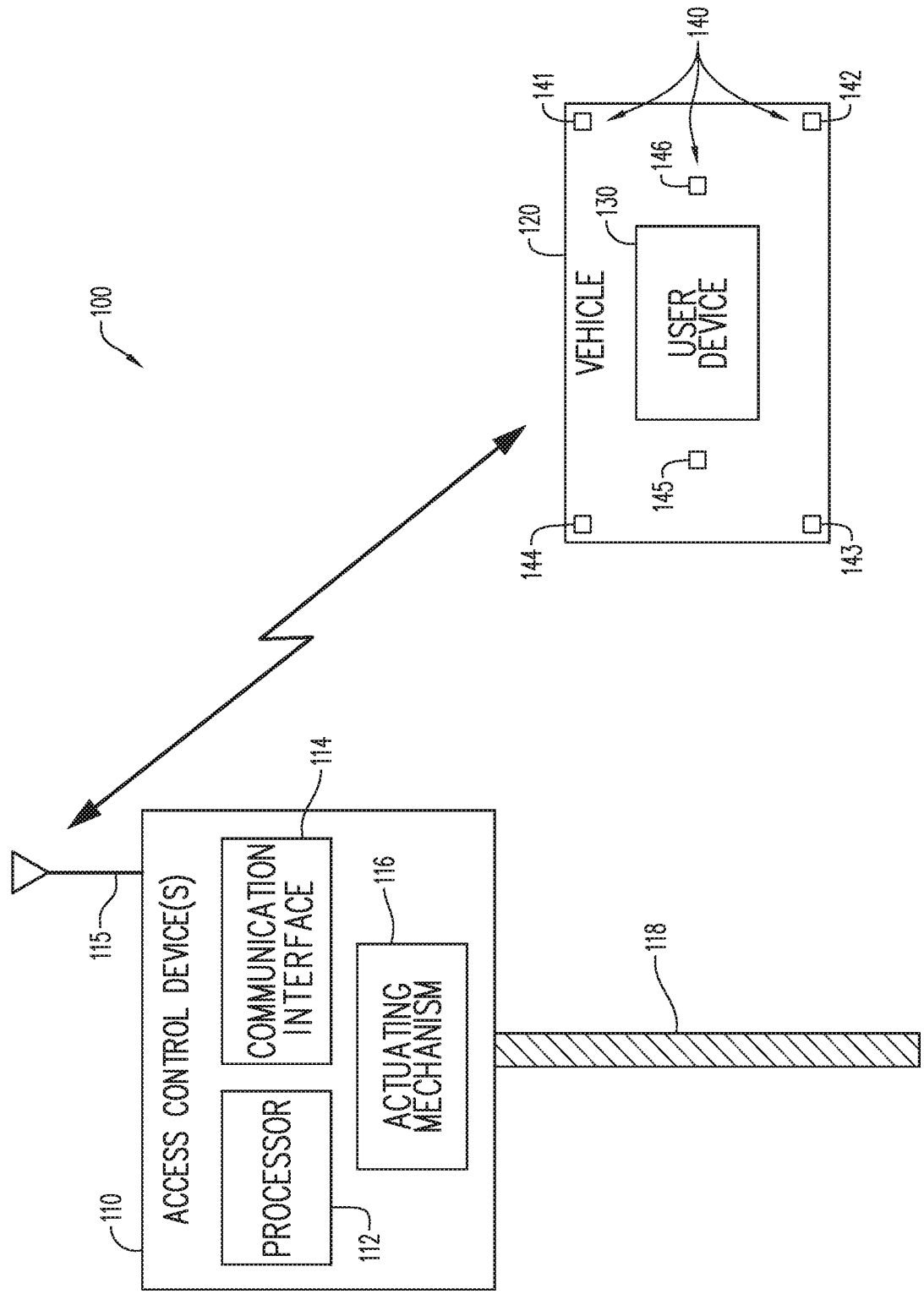
FIG. 1 is a block diagram of an example embodiment of a venue location identification system for vehicular access control in accordance with aspects of the present disclosure.

Referring now to FIG. 1, an example embodiment of a venue location identification system 100 for providing vehicular access control to a parking area is shown. In some embodiments, venue location identification system 100 may be associated with a parking area, such as a parking lot or garage, of a venue. For example, the venue may be a sports arena, concert hall, stadium, museum, school, shopping center, theme park, government building, and/or other environment where parking for vehicles is provided. In some cases, the parking area may include provisions to accommodate a large number of vehicles, such as hundreds, thousands, or tens of thousands of vehicles.

In an example embodiment, venue location identification system 100 includes at least one access control device 110. Access control device 110 may be any type of form of gate or physical barrier that blocks access to vehicles entering and/or exiting the parking area of the venue. In this embodiment, access control device 110 includes a processor 112 that is in communication with a communication interface 114 and an actuating mechanism 116. In some embodiments, processor 112 may be a dedicated central processing unit (CPU) configured to execute instructions to control access control device 110 to allow vehicles to enter and/or exit the parking area of the venue in accordance with the techniques described herein. In other embodiments, processor 112 may be any computer or computing system, including, but not limited to configurations having multiple processors, one or more servers, and/or a distributed computing system that is located remotely from access control device 110 and/or venue location identification system 100.

In some embodiments, access control device 110 also includes an antenna 115 coupled with communication interface 114. Antenna 115 is configured to allow communication interface 114 to transmit signals to and receive signals from one or more vehicles that are communicating with access control device 110 and/or venue location identification system 100. In an example embodiment, communication interface 114 is configured to enable ultra-wideband communication with one or more vehicles. Ultra-wideband (UWB) is a radio technology that uses a very low energy level for short-range, high-bandwidth communications over a large portion of the radio spectrum. For example, UWB currently uses a portion of the frequency spectrum from approximately 3.1 GHz to 10.6 GHz and has a high-frequency bandwidth of more than 500 MHz with very short pulse signals (e.g., less than 1 ns).

While the present embodiments are directed to using UWB communication, the techniques described herein may also be applied to communications using other wireless communication technologies, including Bluetooth, WiFi, and other short-range wireless or near-field communication technologies.

In this embodiment, communication interface 114 is configured to allow access control device 110 of venue location identification system 100 to communicate with one or more vehicles that are entering and/or exiting the parking area, including, for example, a vehicle 120. In one embodiment, communication interface 114 can be a wireless transceiver that transmits and/or receives signals (e.g., commands, messages, information, etc.) to and/or from one or more of vehicles 120 to regulate and manage access control flow to and/or from the parking area of the venue where access control device 110 is located.

In some embodiments, actuating mechanism 116 of access control device 110 is configured to operate a barrier 118. Barrier 118 can be moved by actuating mechanism 116 between a deployed or closed position to block movement (e.g., ingress and/or egress) and a raised or open position to allow vehicles to pass through to enter or exit the parking area of the venue. In this embodiment, barrier 118 is shown in the form of a gate or arm that extends across an access lane to the parking area. Barrier 118 is moved by actuating mechanism 116 from a closed position (e.g., approximately horizontal orientation) to an open position (e.g., approximately vertical orientation) to open the access lane for vehicle 120. In an example embodiment, actuating mechanism 116 may include an electric motor or drive to move barrier 118. In other embodiments, actuating mechanism 116 may further include a hydraulic drive.

In some embodiments, barrier 118 may be any type of barricade, including, but not limited to slide gates, swing gates, pivot gates, turnstyles, retractable bollards, or other barrier mechanisms configured to control and/or prevent unauthorized access to or from a parking area. In some embodiments, access control device 110 may also include additional components, such as vehicle sensors, activation equipment, credential and card readers, access control software systems, payment devices, cameras, and other components conventionally associated with access control devices or entry/exit gates.

According to the techniques of the present embodiments, access control device 110 of venue location identification system 100 is configured to communicate with one or more vehicles, including vehicle 120. In some embodiments, vehicle 120 may be associated with a user device 130, such as a smartphone or mobile device, that communicates with communication interface 114 of access control device 110 by transmitting/receiving UWB signals via antenna 115. For example, when user device 130 with UWB capabilities (e.g., a smartphone) comes close to another UWB device, such as communication interface 114 of access control device 110, the two devices may initiate a ranging process to measure a distance between them. This ranging process may be accomplished through "Time of Flight" (ToF) measurements exchanged between the two devices. The ToF measurements are used to calculate the roundtrip time of challenge/response packets between user device 130 and access control device 110 to determine or measure the separation distance between them.

In some embodiments, vehicle 120 may further include a plurality of anchor sensors 140. Plurality of anchor sensors 140 are electronic devices, such as UWB-capable chips or tags, that detect UWB signals emitted by other nearby UWB devices (e.g., user device 130 and/or access control device 110) and use the detected signals to calculate the location and/or position of the anchor sensors. In some embodiments, the determined location and/or position may be transmitted to the other UWB devices (e.g., user device 130 and/or access control device 110).

In this embodiment, plurality of anchor sensors 140 may include at least a first group of anchors attached or associated with an exterior of vehicle 120. For example, as shown in FIG. 1, the first group of plurality of anchor sensors 140 may include a first anchor 141, a second anchor 142, a third anchor 143, and a fourth anchor 144. In this embodiment, each anchor sensor of the first group of plurality of anchor sensors 140 is mounted or attached to a portion of the exterior of vehicle 120. With this arrangement, the first group of anchor sensors may be used to define the boundaries or exterior dimensions of vehicle 120.

As shown in FIG. 1, first anchor 141, second anchor 142, third anchor 143, and fourth anchor 144 are attached or mounted on the four corners of vehicle 120 to define a length and width of vehicle 120. For example, first anchor 141 and second anchor 142 may be attached to a rear bumper of vehicle 120 and third anchor 143 and fourth anchor 144 may be attached to a front bumper of vehicle 120. Accordingly, a length of vehicle 120 may be calculated or determined based on a separation distance between first anchor 141 on the rear bumper of vehicle 120 and fourth anchor 144 on the front bumper (as well as the separation distance between second anchor 142 on the rear bumper and third anchor 143 on the front bumper). Similarly, a width of vehicle 120 may be calculated or determined based on a separation distance between first anchor 141 and second anchor 142 on the rear bumper of vehicle 120 (as well as the separation distance between third anchor 143 and fourth anchor 144 on the front bumper of vehicle 120).

In some embodiments, plurality of anchor sensors 140 may also include at least a second group of anchors attached or associated with an interior of vehicle 120. For example, as shown in FIG. 1, the second group of plurality of anchor sensors 140 may include a fifth anchor 145 and a sixth anchor 146. In this embodiment, each anchor sensor of the second group of plurality of anchor sensors 140 is mounted or attached to a portion of the interior of vehicle 120. With this arrangement, the second group of anchor sensors may be used to detect the presence of user device 130 within the interior of vehicle 120.

Additionally, in some embodiments, one anchor sensor of plurality of anchor sensors 140 may be a master sensor that is configured to manage communication between the other anchor sensors of plurality of anchor sensors 140. For example, in this embodiment, fifth anchor 145 may be the master sensor that manages communication with one or more of first anchor 141, second anchor 142, third anchor 143, fourth anchor 144, and sixth anchor 146. Master sensor 145 may then communicate the received locations and/or positions from the other anchor sensors to user device 130 and/or access control device 110.

Figure 2:
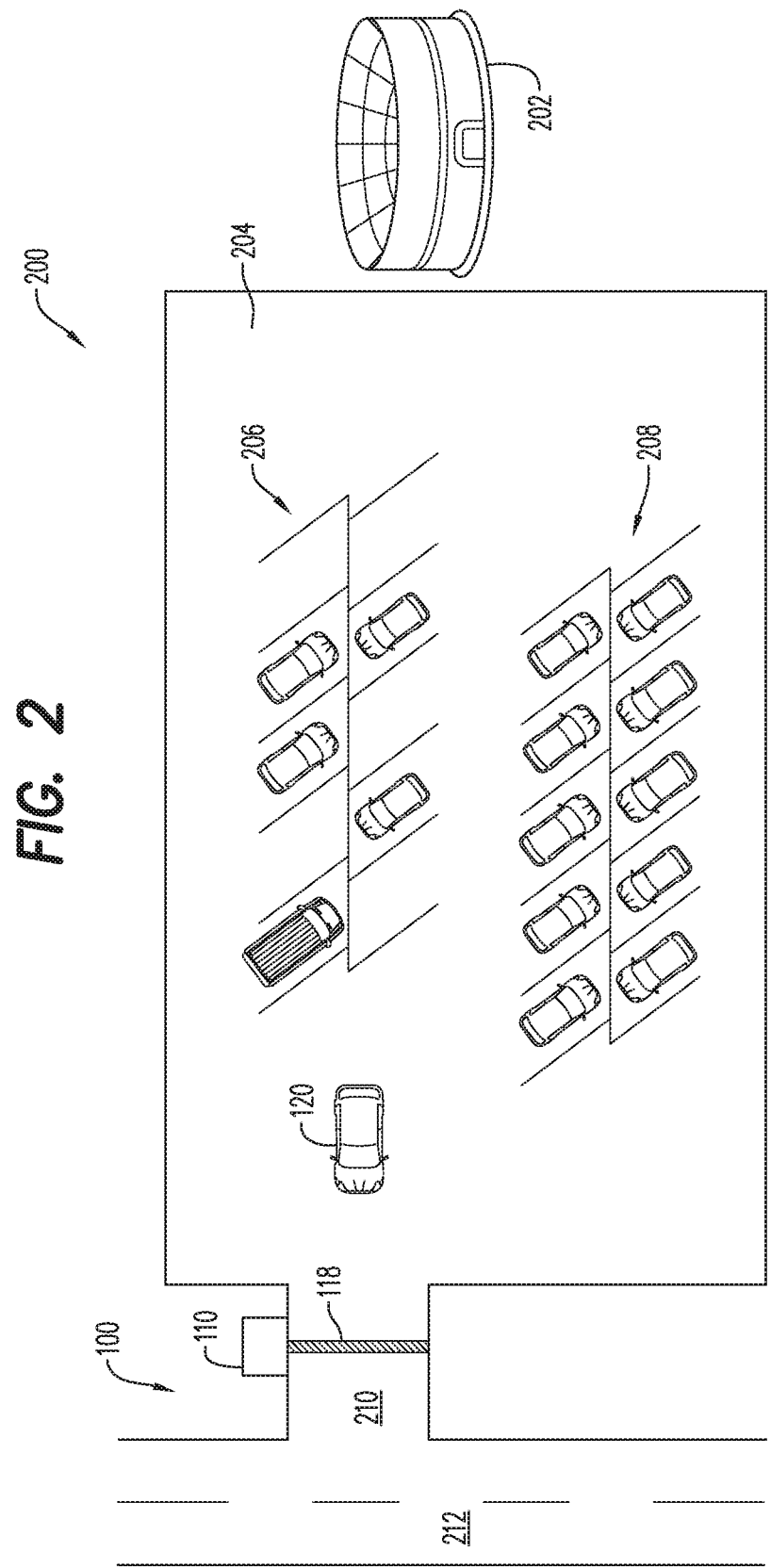
FIG. 2 is a schematic view of an example environment in which a venue location identification system for vehicular access control may be provided in accordance with aspects of the present disclosure.

Referring now to FIG. 2, an example environment 200 in which venue location identification system 100 for vehicular access control may be provided is shown. In this embodiment, environment 200 includes a stadium 202 and at least one parking lot 204 for vehicles. Parking lot 204 is shown having multiple rows of parking spaces, including a first row 206 and a second row 208, that are configured to accommodate vehicles. It should be understood that in other embodiments, environment 200 may include additional parking lots and each parking lot may include any number of rows of parking spaces. In addition, while environment 200 includes stadium 202, the principles of the example embodiments may be applied to any venue that includes a parking area, as described above.

As shown in FIG. 2, access to parking lot 204 is controlled by access control device 110 of venue location identification system 100. Barrier 118 is in a deployed or closed position so that an entrance/exit lane 210 is blocked by barrier 118 to prevent vehicles, such as vehicle 120, from entering or exiting parking lot 204. As will be described below, as vehicle 120 approaches access control device 110, venue location identification system 100 may be used to allow vehicle 120 to pass through entrance/exit lane 210 and reach a surface road 212.

Referring now to FIG. 3, an example embodiment of vehicular access control using venue location identification system 100 in environment 200 is shown in accordance with aspects of the present disclosure. In some embodiments, venue location identification system 100 may be used in environment 200 to help manage and regulate flow control for people leaving parking lot 204, for example, after an event concludes at stadium 202 or other venue. In this embodiment, a user 300 is preparing to enter vehicle 120 to leave parking lot 204.

As shown in FIG. 3, user 300 is holding user device 130 (e.g., a smartphone or other mobile device) and a door 302 of vehicle 120 is open so that user 300 may enter vehicle 120 to leave the parking lot. In some embodiments, user device 130 may include an application or other program that allows user 300 to interact with access control device 110 of venue location identification system 100 to exit the parking lot. As described above, communication between user device 130 and communication interface 114 of access control device 110 of venue location identification system 100, as well as with processor 112 and/or plurality of anchor sensors 140, may be accomplished using UWB. The application on user device 130 may also allow user 300 to provide payment for any fees associated with parking in parking lot 204. For example, payment information from user 300 to venue location identification system 100 may be initiated and/or controlled via the application on user device 130 using a variety of known payment systems, such as electronic wallets or credit cards.

In this embodiment, one or more of plurality of anchor sensors 140, including first anchor 141, second anchor 142, third anchor 143, fourth anchor 144, fifth sensor 145, and/or sixth anchor 146, may also communicate with user device 130 to determine that user 300 is presently located outside of vehicle 120. That is, based on the determined location of user 300 and user device 130, venue location identification system 100 can determine that user 300 is not yet ready to exit the parking lot in vehicle 120.

Figure 4:
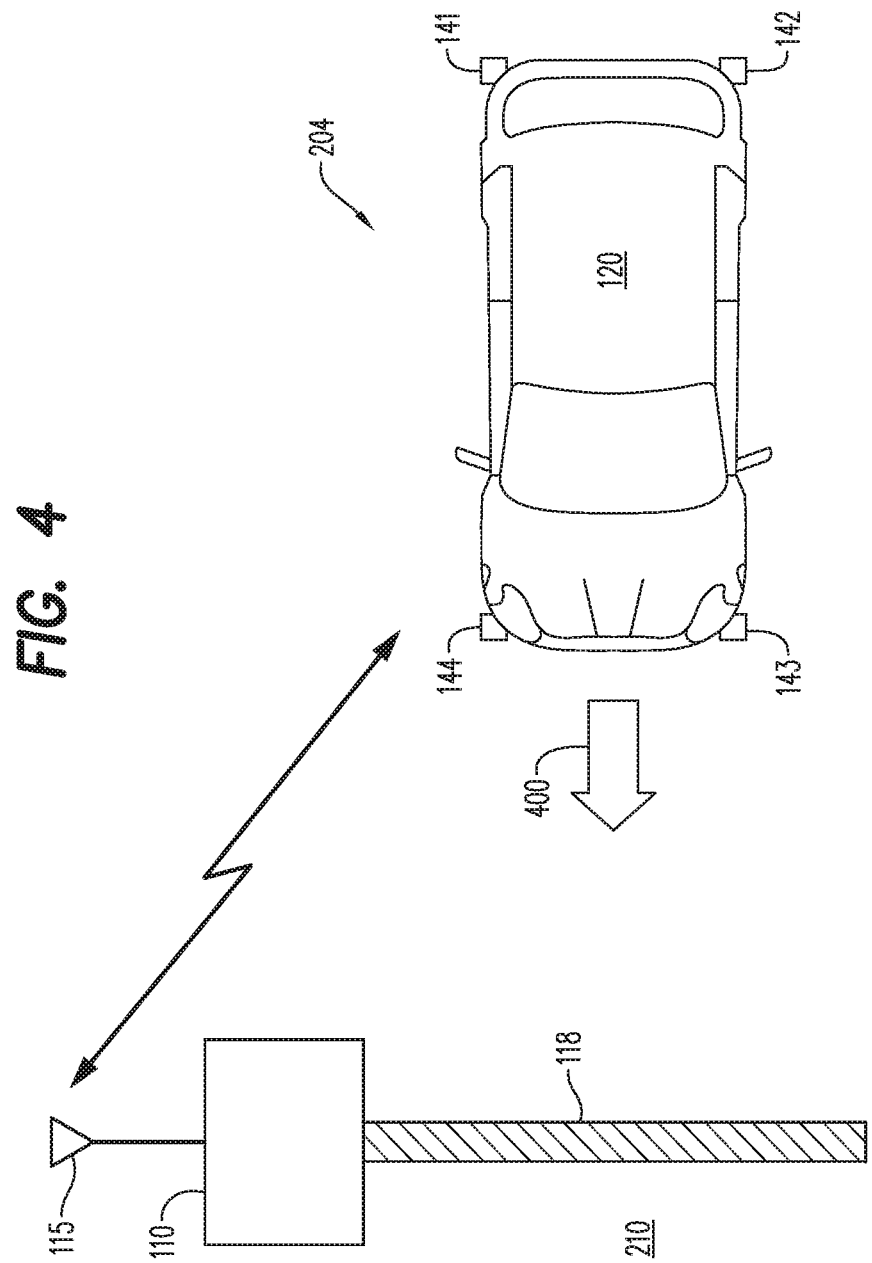
FIG. 4 is a representative view of the example embodiment of the venue location identification system communicating with a vehicle in accordance with aspects of the present disclosure.

Referring now to FIG. 4, venue location identification system 100 is shown communicating with vehicle 120 as vehicle 120 approaches barrier 118 of access control device 110. In some embodiments, when vehicle 120 moves in a direction 400 towards access control device 110 of venue location identification system 100, user device 130 and/or one or more of plurality of anchor sensors 140 may communicate via UWB with access control device 110. Upon determining that vehicle 120 is within a predetermined distance from barrier 118, access control device 110 may control barrier 118 to move to the raised or open position so that vehicle 120 may enter entrance/exit lane 210 and reach surface road 212 to leave parking lot 204.

Figure 5:
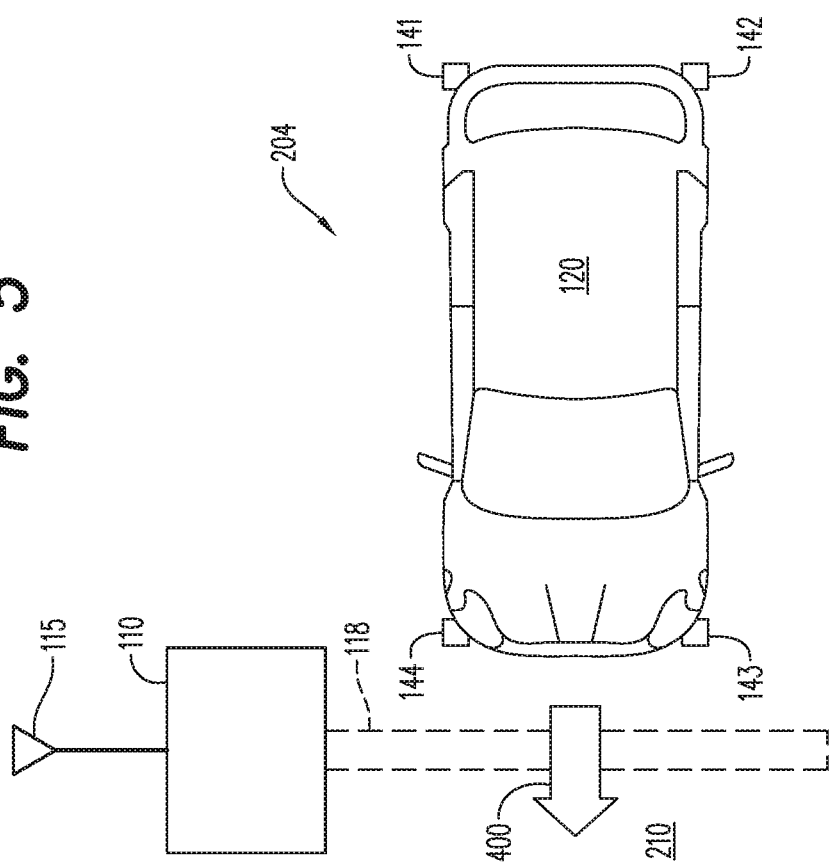
FIG. 5 is a representative view of the example embodiment of the venue location identification system providing vehicular access control in accordance with aspects of the present disclosure.

For example, as shown in FIG. 5, once venue location identification system 100 determines that vehicle 120 is authorized to exit parking lot 204, barrier 118 is raised (e.g., shown in phantom in FIG. 5) by access control device 110 to provide vehicular access control in accordance with aspects of the present disclosure. In an example embodiment, access control device 110 may instruct or control actuating mechanism 116 to move or lift barrier 118 to the raised or open position so that vehicle 120 may exit parking lot 204 via entrance/exit lane 210 and reach surface road 212.

Figure 6:
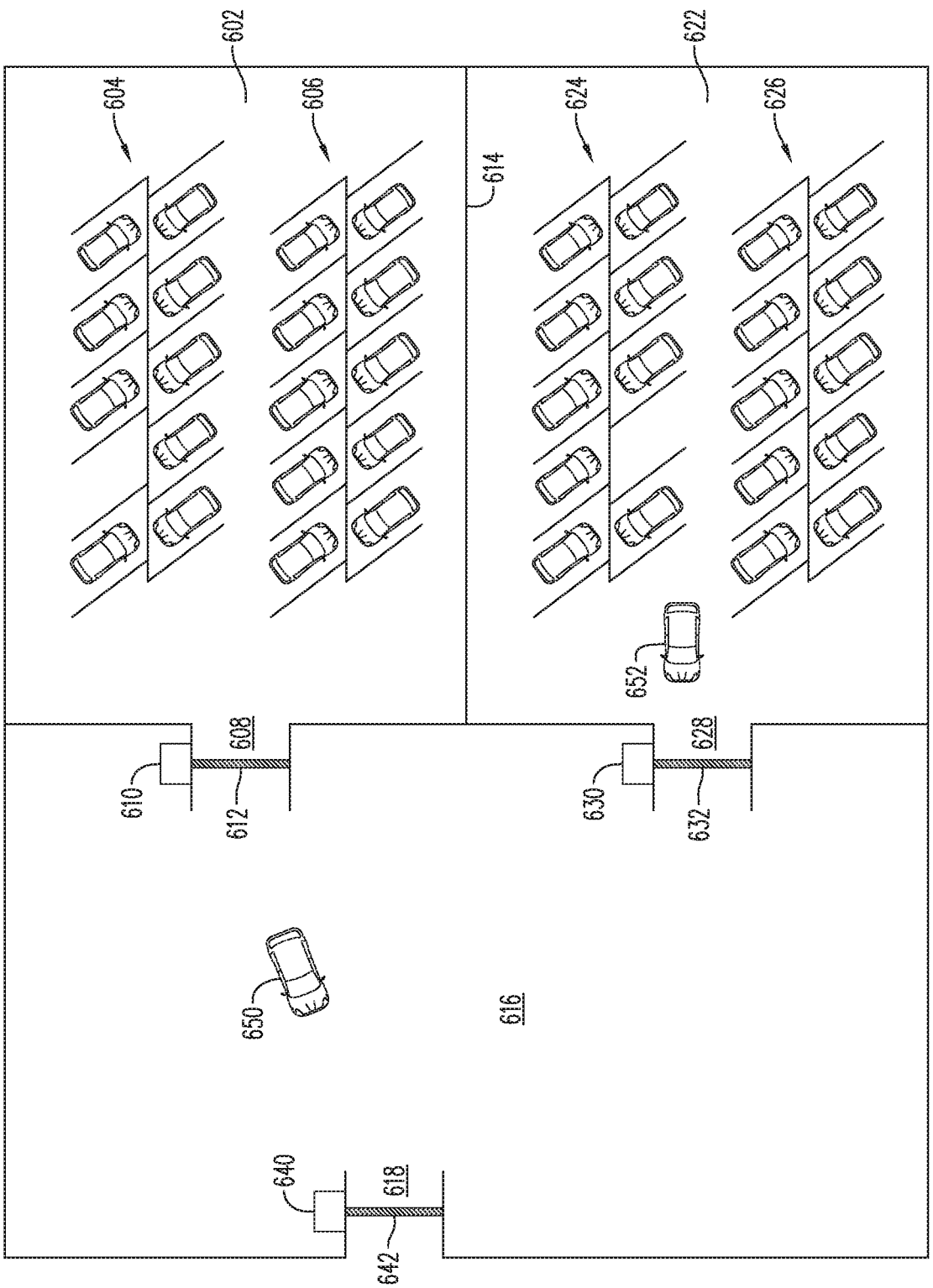
FIG. 6 is a schematic view of an alternate embodiment of a venue location identification system for staggered vehicular access control in accordance with aspects of the present disclosure.

In some embodiments, a venue location identification system according the present techniques (e.g., venue location identification system 100) may include multiple access control devices to control more than one exit/entrance to a parking area or multiple parking areas. Referring now to FIG. 6, an alternate embodiment of a venue location identification system 600 for staggered vehicular access control using multiple access control devices is shown. In an example embodiment, venue location identification system 600 may be deployed at a venue or environment that includes multiple parking areas, for example, a first parking area 602 and a second parking area 622. In this embodiment, first parking area 602 and second parking area 622 are both surface parking lots that include a plurality of parking spaces arranged in multiple rows, including a first row 604 and a second row 606 associated with first parking area 602 and a third row 624 and a fourth row 626 associated with second parking area 622.

As shown in FIG. 6, first parking area 602 and second parking area 622 are physically separated by a wall or divider 614 that prevents vehicles from crossing between first parking area 602 and second parking area 622 without using an access control device to leave one parking area and enter the other. In this embodiment, venue location identification system 600 includes multiple access control devices, including a first access control device 610 associated with managing and controlling access to first parking area 602 and a second access control device 630 associated with managing and controlling access to second parking area 622. In other embodiments, venue location identification system 600 may include any number of parking areas and/or access control devices.

In an example embodiment, venue location identification system 600 is substantially similar to venue location identification system 100, described above. Similarly, each access control device of venue location identification system 600 may be substantially similar to access control device 110, described above in reference to FIG. 1. For example, in this embodiment, first access control device 610 controls entry to a first access lane 608 that permits entry to and exit from first parking area 602 using a barrier 612 and second access control device 630 controls entry to a second access lane 628 that permits entry to and exit from second parking area 622 using a barrier 632.

In an example embodiment, venue location identification system 600 may coordinate vehicular access control to and/or from the venue by managing first access control device 610 and second access control device 630 in a coordinated manner to limit the number of vehicles arriving or leaving the venue at the same time. In an example embodiment, venue location identification system 600 further includes a main access control device 640 that is substantially similar to access control device 110. Main access control device 640 controls entry to a main access lane 618 that permits entry to and exit from an entry area 616 using a barrier 632. In this embodiment, entry area 616 is a portion of the overall parking area at the venue and allows vehicles to enter the parking area from a surface road via main access lane 618 controlled by main access control device 640.

With this arrangement, vehicles entering into entry area 616 at the venue may then choose between first parking area 602 and second parking area 622, for example, using the respective first access control device 610 and/or second access control device 630. By providing multiple parking areas and access control devices, a higher rate or flow of vehicular traffic may be allowed to manage a large number of vehicles entering and/or leaving the parking area at the venue. Similarly, venue location identification system 600 may also use the multiple access control devices (e.g., first access control device 610, second access control device 630, and main access control device 640) to regulate and/or manage vehicular flow of vehicles leaving the parking area of the venue.

In an example embodiment, venue location identification system 600 may individually control first access control device 610, second access control device 630, and/or main access control device 640 to stagger the departure of vehicles from the various parking areas at the venue (e.g., first parking area 602, second parking area 622, and/or entry area 616). For example, as shown in FIG. 6, a first vehicle 650 has exited first parking area 602 through first access control device 610 and is presently in entry area 616 heading towards main access control device 640 to leave the venue. In order to prevent vehicles backing up in entry area 616 and/or at main access control device 640, venue location identification system 600 may stagger the vehicles so that while first vehicle 650 is in entry area 616, a second vehicle 652 attempting to exit second parking area 622 is made to wait at second access control device 630.

That is, second access control device 630 controls barrier 632 to remain blocking second access lane 628 to prevent second vehicle 652 from exiting second parking area 622 and entering entry area 616 until first vehicle 650 has exited the venue parking area through main access control device 640. Once first vehicle 650 departs through main access lane 618 to the surface road, venue location identification system 600 may then instruct or allow second access control device 630 to raise barrier 632 to allow second vehicle 652 into entry area 616 to leave the venue. With this arrangement, venue location identification system 600 may provide for improved vehicular flow control at a venue or other environment.

While the example described above in reference to FIG. 6 staggered or alternated vehicles from each parking area (e.g., first parking area 602 and second parking area 622), in other embodiments, different criteria or logic may be used to determine the vehicular flow control to manage access into or out of the parking area at the venue. For example, a total number of vehicles in entry area 616 may be limited, with each of first access control device 610, second access control device 630, and main access control device 640 being used to control vehicles entering or exiting in a manner consistent with a predetermined number of vehicles that are allowed within entry area 616 at any given time.

In some embodiments, entry area 616 may also include additional components, such as pay stations or other mechanisms to allow users of vehicles parked at the venue to prepay for their parking services before reaching main access control device 640. For example, as will be further described below, in some embodiments, UWB communication between vehicles and/or user devices associated with the vehicles and venue location identification system 600 may be used to determine whether or not a vehicle has paid for parking as it is attempting to leave the parking area at the venue. With this arrangement, the techniques of the present embodiments provide a more efficient solution for allowing vehicles to exit a parking lot based on each vehicle's location and/or status information.

In some embodiments, information associated with a vehicle may be transmitted via UWB to a venue location identification system to further assist with managing vehicular flow leaving a parking area at a venue. In an example embodiment, information associated with a vehicle's size or dimensions may be used by the venue location identification system to direct the vehicle to a selected access control device or exit at the venue. Referring now to FIG. 7, another alternate embodiment of a venue location identification system 700 for sized-based vehicular access control is shown. In this embodiment, venue location identification system 700 may be used to control the flow of vehicles exiting a parking area 702 that includes a first access control device 710 and a second access control device 720. In an example embodiment, first access control device 710 and second access control device 720 have different dimensions to accommodate vehicles of different sizes.

In this embodiment, first access control device 710 controls entry to a first access lane 712 that permits entry to and exit from parking area 702 using a barrier 714 and second access control device 720 controls entry to a second access lane 722 that permits entry to and exit from parking area 702 using a barrier 724. In one embodiment, second access control device 720 is configured to accommodate vehicles that are a wider or larger size than would be able to fit through first access control device 710. For example, in this embodiment, first access lane 712 managed by first access control device 710 has a first width (W1) that is smaller than a second width (W2) of second access lane 722 managed by second access control device 720. That is, second access lane and/or second access control device 720 are configured to accommodate oversized vehicles. While this example is described in reference to vehicles of different widths, other differences in size may also be accommodated by different access control devices, such as different vehicle heights, lengths, weights, or other characteristics.

For example, conventional passenger vehicles have typical widths of approximately 6 to 6.5 feet, whereas oversized vehicles are at least wider than 6.5 feet. In some embodiments, oversized vehicles have a width of at least 8.5 feet or larger.

In some embodiments, a plurality of anchor sensors disposed on portions of a vehicle may be used to communicate information about the vehicle's dimensions (e.g., width, length, and/or height) via UWB to venue location identification system 700, first access control device 710 and/or second access control device 720. For example, as shown in FIG. 7, vehicle 120 is associated with plurality of anchor sensors 140, including first anchor 141, second anchor 142, third anchor 143, and fourth anchor 144 as described above in reference to FIG. 1. Similarly, an oversized vehicle 704 is associated with a second plurality of anchor sensors, including a first anchor 705, a second anchor 706, a third anchor 707, and a fourth anchor 708.

As shown in FIG. 7, first anchor 141, second anchor 142, third anchor 143, and fourth anchor 144 are attached or mounted on the four corners of vehicle 120 to define a length and width of vehicle 120. For example, first anchor 141 and second anchor 142 may be attached to a rear bumper of vehicle 120 and third anchor 143 and fourth anchor 144 may be attached to a front bumper of vehicle 120. Accordingly, a length of vehicle 120 may be calculated or determined based on a separation distance between first anchor 141 on the rear bumper of vehicle 120 and fourth anchor 144 on the front bumper (as well as the separation distance between second anchor 142 on the rear bumper and third anchor 143 on the front bumper). Similarly, a width (W3) of vehicle 120 may be calculated or determined based on a separation distance between first anchor 141 and second anchor 142 on the rear bumper of vehicle 120 (as well as the separation distance between third anchor 143 and fourth anchor 144 on the front bumper of vehicle 120).

Additionally, first anchor 705, second anchor 706, third anchor 707, and fourth anchor 708 are attached or mounted on the four corners of oversized vehicle 704 to define a length and width of oversized vehicle 704. For example, first anchor 705 and second anchor 706 may be attached to a rear bumper of oversized vehicle 704 and third anchor 707 and fourth anchor 708 may be attached to a front bumper of oversized vehicle 704. Accordingly, a length of oversized vehicle 704 may be calculated or determined based on a separation distance between first anchor 705 on the rear bumper of oversized vehicle 704 and fourth anchor 708 on the front bumper (as well as the separation distance between second anchor 706 on the rear bumper and third anchor 707 on the front bumper). Similarly, a width (W4) of oversized vehicle 704 may be calculated or determined based on a separation distance between first anchor 705 and second anchor 706 on the rear bumper of oversized vehicle 704 (as well as the separation distance between third anchor 707 and fourth anchor 708 on the front bumper of oversized vehicle 704).

In an example embodiment, the dimensions of each vehicle may be determined by venue location identification system 700 using the location information of each of the plurality of anchor sensors transmitted via UWB. In other embodiments, a master sensor (e.g., master sensor 145, described above) may determine or store the dimensions of the vehicle from the plurality of anchor sensors and may transmit this value or information to venue location identification system 700 using UWB. With this arrangement, venue location identification system 700 may regulate or manage the flow of vehicle traffic exiting parking area 702 based on the information associated with each vehicle (e.g., vehicle dimensions in this example).

For example, in this embodiment, the width (W4) of oversized vehicle 704 is larger or wider than the width (W3) of vehicle 120 (i.e., W4>W3). As a result, while vehicle 120 may easily fit through first access lane 712 having first width (W1) controlled by first access control device 710 (i.e., W3<W1), the width (W4) of oversized vehicle 704 is too wide or large to fit through first access lane 712 having first width (W1) (i.e., W4>W1). According to the principles of the example embodiments, upon receiving the dimensions of oversized vehicle 704 via UWB, venue location identification system 700 may direct oversized vehicle 704 to second access lane 722 managed by second access control device 720 that has second width (W2) that is sufficient to accommodate oversized vehicle 704 (i.e., W2>W4).

Referring now to FIG. 8, a flowchart of a method 800 for providing vehicular access control using a venue location identification system in accordance with aspects of the present disclosure is shown. In some embodiments, method 800 may be implemented by a computer or processor associated with a venue location identification system, for example, venue location identification system 100, 600, and/or 700, as described above. In an example embodiment, method 800 may begin with an operation 802. At operation 802, an access request is received from an approaching vehicle. For example, at operation 802, vehicle 120 approaching access control device 110 of venue location identification system 100 may transmit an access request to access control device 110 via UWB requesting permission to leave the parking area. This access request can be received at communication interface 114 of access control device 110 via the UWB signal.

Next, at an operation 804, method 800 includes determining an access status of the approaching vehicle. For example, operation 804 may include using vehicle information transmitted via UWB along with the access request to determine the vehicle's access status. In other embodiments, operation 804 may also include receiving and/or determining a payment status of the vehicle making the access request. For example, the payment status may be used to determine if the approaching vehicle owes any fees for parking at the parking area and/or whether payment for the parking services has already been made by the user of the approaching vehicle (e.g., using the application on the user device 130).

Method 800 also includes an operation 806. At operation 806, whether or not the approaching vehicle is approved to exit is determined. For example, as described above, whether or not the vehicle is approved to exit may be based on the determined access status at operation 804. Upon determining at operation 806 that the vehicle is not approved to exit (e.g., the decision at operation 806 is "N" for No), then method 800 proceeds to an operation 808. At operation 808, the vehicle is directed to a secondary area. For example, the secondary area may include a pay station or other mechanism to allow the user of the vehicle to pay for parking services. In another example, the secondary area may include a different access control device configured to accommodate the approaching vehicle, such as an access control device for oversized vehicles (e.g., second access control device 720 configured to accommodate oversized vehicle 704, as shown in FIG. 7).

Upon determining at operation 806 that the vehicle is approved to exit (e.g., the decision at operation 806 is "Y" for Yes), then method 800 proceeds to an operation 810. At operation 810, an instruction is sent to the access control device to open to allow the vehicle to exit the parking area. For example, at operation 810, processor 112 and/or another computer or processor associated with venue location identification system 100 sends a command or instruction to actuating mechanism 116 of access control device 110 to move or raise barrier 118 from the deployed or closed position to the open position to allow the vehicle to pass through to exit the parking area of the venue. With this arrangement, vehicle location identification using UWB at a venue may be provided to regulate and manage vehicular access control to and from a parking area.

The techniques described herein utilize ultra wideband communication to provide a method and system that allows vehicular flow control of vehicles in a parking area of a venue or other environment. In contrast to other short-range communication technologies, such as Bluetooth, UWB provides a more precise and accurate location and identification of dimensions of a vehicle. UWB also uses less power and costs less than other short-range communication technologies, such as Bluetooth. Moreover, communication using UWB does not suffer from attenuation issues exhibited by other short-range communication technologies, such as Bluetooth, which cause diminished signals and accuracy due to water, proximity to bodies of the users, and/or other people that may be nearby the user or the user's device.

The principles of the disclosure may be implemented in various locations and situations where access control is part of a security protocol. While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A venue location identification system for vehicular access control, the system comprising:
 a first access control device associated with a first access lane having a first width, the first access control device including a processor, a communication interface, and an actuating mechanism configured to control a barrier for providing access to a parking area through the first access lane;
 a second access control device associated with a second access lane having a second width, the second access control device including a processor, a communication interface, and an actuating mechanism configured to control a barrier for providing access to the parking area through the second access lane, wherein the second width of the second access lane is larger than the first width of the first access lane;
 a user device associated with a vehicle, wherein the user device is configured to communicate with the communication interface of the first access control device and/or the communication interface of the second access control device using ultra wideband (UWB) communication technology;
 wherein the user device is configured to transmit an access request to the first access control device and/or the second access control device via UWB requesting permission to leave the parking area; and
 wherein the venue location identification system is configured to direct the vehicle to one of the first access lane or the second access lane based on dimensions of the vehicle received by the venue location identification system.

2. The system according to claim 1, wherein each barrier is movable between a closed position blocking the first access lane or the second access lane of the parking area and an open position allowing vehicles to pass through the first access lane or the second access lane into and/or out of the parking area.

3. The system according to claim 1, further comprising a plurality of anchor sensors associated with the vehicle; and
 wherein the plurality of anchor sensors are configured to communicate with at least one of the user device or the communication interface of the first access lane or the second access lane via UWB.

4. The system according to claim 3, wherein the plurality of anchor sensors comprises a first group of anchor sensors attached to an exterior of the vehicle.

5. The system according to claim 4, wherein the first group of anchor sensors include at least one anchor sensor disposed on each corner of the vehicle; and
 wherein a separation distance between the first group of anchor sensors defines a length and/or a width of the vehicle.

6. The system according to claim 5,
 wherein the venue location identification system is configured to direct the vehicle to one of the first access lane or the second access lane based on the width of the vehicle determined from the separation distance between the first group of anchor sensors on the vehicle.

7. The system according to claim 4, wherein the plurality of anchor sensors further comprises a second group of anchor sensors associated with an interior of the vehicle.

8. The system according to claim 7, wherein the second group of anchor sensors includes a master sensor that is configured to communicate with each other anchor sensor of the plurality of anchor sensors.

9. The system according to claim 1,
 wherein the first access control device is associated with a first parking area;
 wherein the second access control device is associated with a second parking area that is separated from the first parking area; and
 wherein the venue location identification system is configured to alternate access for vehicles leaving the first parking area and the second parking area by controlling the first access control device and the second access control device.

10. A method for providing vehicular access control to a parking area at a venue, the method comprising:
 receiving an access request from a vehicle approaching a first access control device associated with a first access lane having a first width and a second access control device associated with a second access lane having a second width larger than the first width, the access request being received via ultra wideband (UWB) communication technology;

determining an access status of the vehicle;
determining whether or not the vehicle is approved to exit the parking area of the venue;
receiving dimensions of the vehicle; and
upon determining that the vehicle is approved to exit, directing the vehicle to one of the first access lane or the second access lane based on the received dimensions of the vehicle and controlling a barrier of the said one of the first access control device or the second access control device to an open position to allow the vehicle to exit the parking area through the first access lane or the second access lane.

11. The method according to claim 10, wherein, upon determining that the vehicle is not approved to exit, directing the vehicle to a secondary area.

12. The method according to claim 11, wherein the secondary area includes a pay station configured to accept payment for parking services associated with the parking area.

13. The method according to claim 11, wherein the secondary area includes another access control device having a width configured to accommodate oversized vehicles.

14. The method according to claim 10, further comprising receiving vehicle information via UWB from a plurality of anchor sensors associated with the vehicle.

15. The method according to claim 14, wherein the plurality of anchor sensors includes at least one anchor sensor disposed on each corner of the vehicle; and
wherein a separation distance between the first group of anchor sensors defines a length and/or a width of the vehicle.

16. The method according to claim 15, wherein determining the access status of the vehicle includes determining a width of the vehicle based on the information from the plurality of anchor sensors.

17. The method according to claim 10,
wherein the first access control device is associated with a first parking area;
wherein the second access control device is associated with a second parking area that is separated from the first parking area; and
the method further comprising alternating access for vehicles leaving the first parking area and the second parking area by controlling the first access control device and the second access control device.

18. A venue location identification system for vehicular access control, the system comprising:
a plurality of access control devices, each access control device including a processor, a communication interface, and an actuating mechanism configured to control a barrier for providing access to a parking area;
the plurality of access control devices including at least a first access control device associated with a first access lane having a first width and a second access control device associated with a second access lane having a second width larger than the first width;
a user device associated with a vehicle, wherein the user device is configured to communicate with the communication interface of at least one of the first access control device or the second access control device using ultra wideband (UWB) communication technology; and
wherein the venue location identification system is configured to receive information associated with the vehicle via UWB, wherein the information includes dimensions of the vehicle, and direct the vehicle to one of the first access lane or the second access lane based on dimensions of the vehicle received by the venue location identification system.

19. The system according to claim 18, wherein the dimensions include a width of the vehicle determined based on a separation distance between a plurality of anchor sensors associated with the vehicle.

20. The system according to claim 18, wherein the first access control device is associated with a first parking area and the second access control device is associated with a second parking area that is separated from the first parking area; and
wherein the venue location identification system is configured to alternate access for vehicles leaving the first parking area and the second parking area by controlling the first access control device and the second access control device.

* * * * *